United States Patent [19]

Feldman

[11] 4,184,662

[45] Jan. 22, 1980

[54] VALVE FOR CONTROLLING SOLIDS FLOW

[75] Inventor: David K. Feldman, Fairlawn, N.J.

[73] Assignee: The United States of America as represented by the United States Department of Energy, Washington, D.C.

[21] Appl. No.: 927,806

[22] Filed: Jul. 25, 1978

[51] Int. Cl.² .................. F16K 15/03; F16K 31/44
[52] U.S. Cl. ............................ 251/82; 137/513.5; 137/527.8; 137/527.6; 137/244; 251/147; 251/205
[58] Field of Search ............... 137/382, 513.5, 513.7, 137/527.6, 527.8, 244; 251/205, 157, 147, 82

[56] References Cited

U.S. PATENT DOCUMENTS

| 1,097,879 | 5/1914 | Reichard | 137/513.5 |
| 2,672,883 | 3/1954 | Dillman | 251/205 |
| 2,838,062 | 6/1958 | Held et al. | 137/527.6 X |
| 2,838,063 | 6/1958 | Weits et al. | 137/527.6 X |
| 2,838,065 | 6/1958 | Held et al. | 137/527.6 X |
| 2,901,331 | 8/1959 | Held et al. | 137/527.8 X |
| 2,999,666 | 9/1961 | Sjogren | 251/82 |
| 4,074,691 | 2/1978 | Luckenbach | 137/527.6 X |

FOREIGN PATENT DOCUMENTS 566043  8/1957  Italy ................................... 251/82

Primary Examiner—William R. Cline
Attorney, Agent, or Firm—R. V. Lupo; Frank H. Jackson; Hugh W. Glenn

[57] ABSTRACT

A fluidized solids control valve is disclosed that is particularly well adapted for use with a flow of coal or char that includes both large particles and fines. The particles may or may not be fluidized at various times during the operation. The valve includes a tubular body that terminates in a valve seat covered by a normally closed closure plate. The valve body at the seat and the closure plate is provided with aligned longitudinal slots that receive a pivotally supported key plate. The key plate is positionable by an operator in inserted, intermediate and retracted positions respecting the longitudinal slot in the valve body. The key plate normally closes the slot within the closure plate but is shaped and aligned obliquely to the longitudinal slot within the valve body to provide progressively increasing slot openings between the inserted and retracted positions. Transfer members are provided between the operator, key plate and closure plate to move the closure plate into an open position only when the key plate is retracted from the longitudinal slot within the valve body.

10 Claims, 4 Drawing Figures

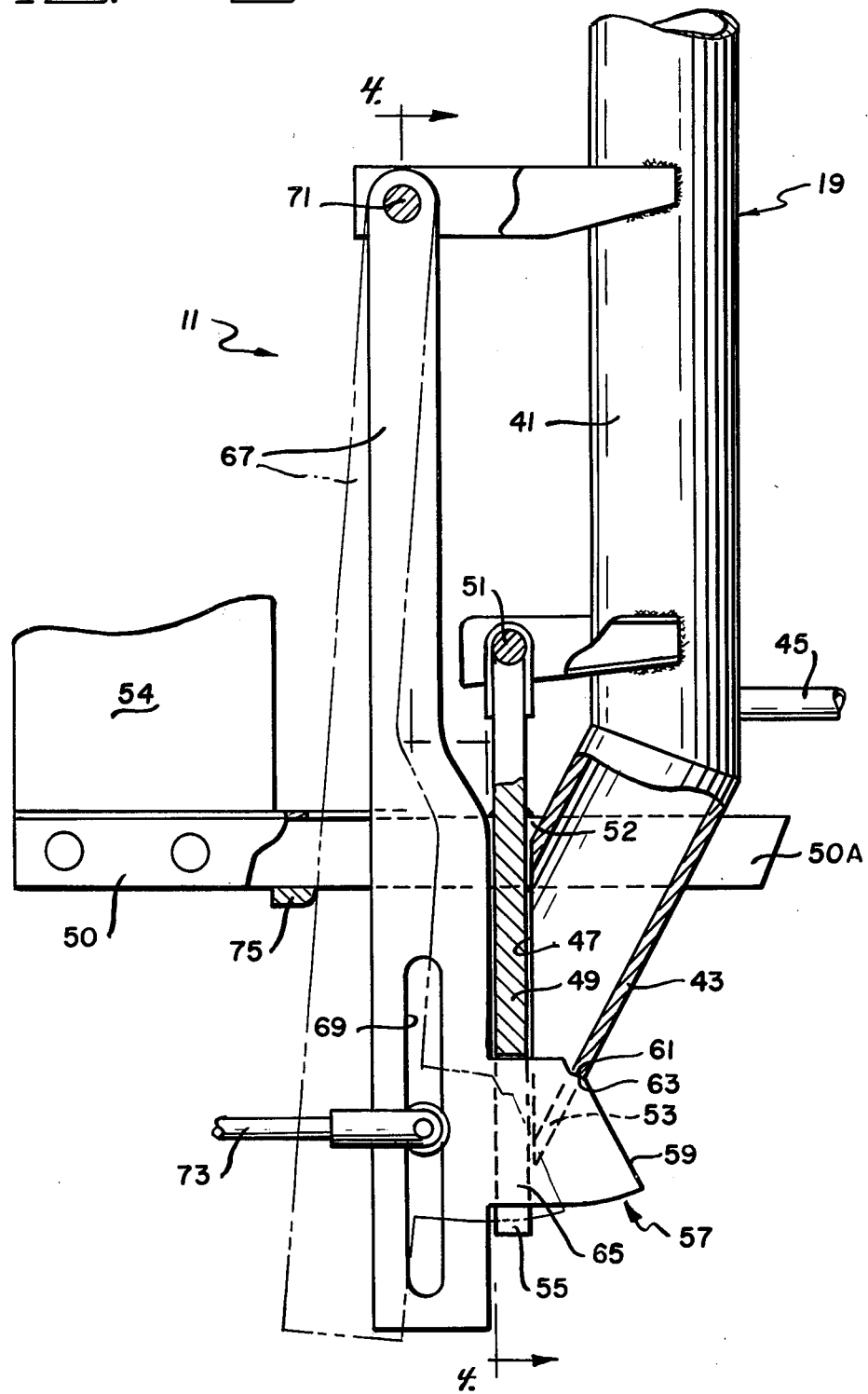

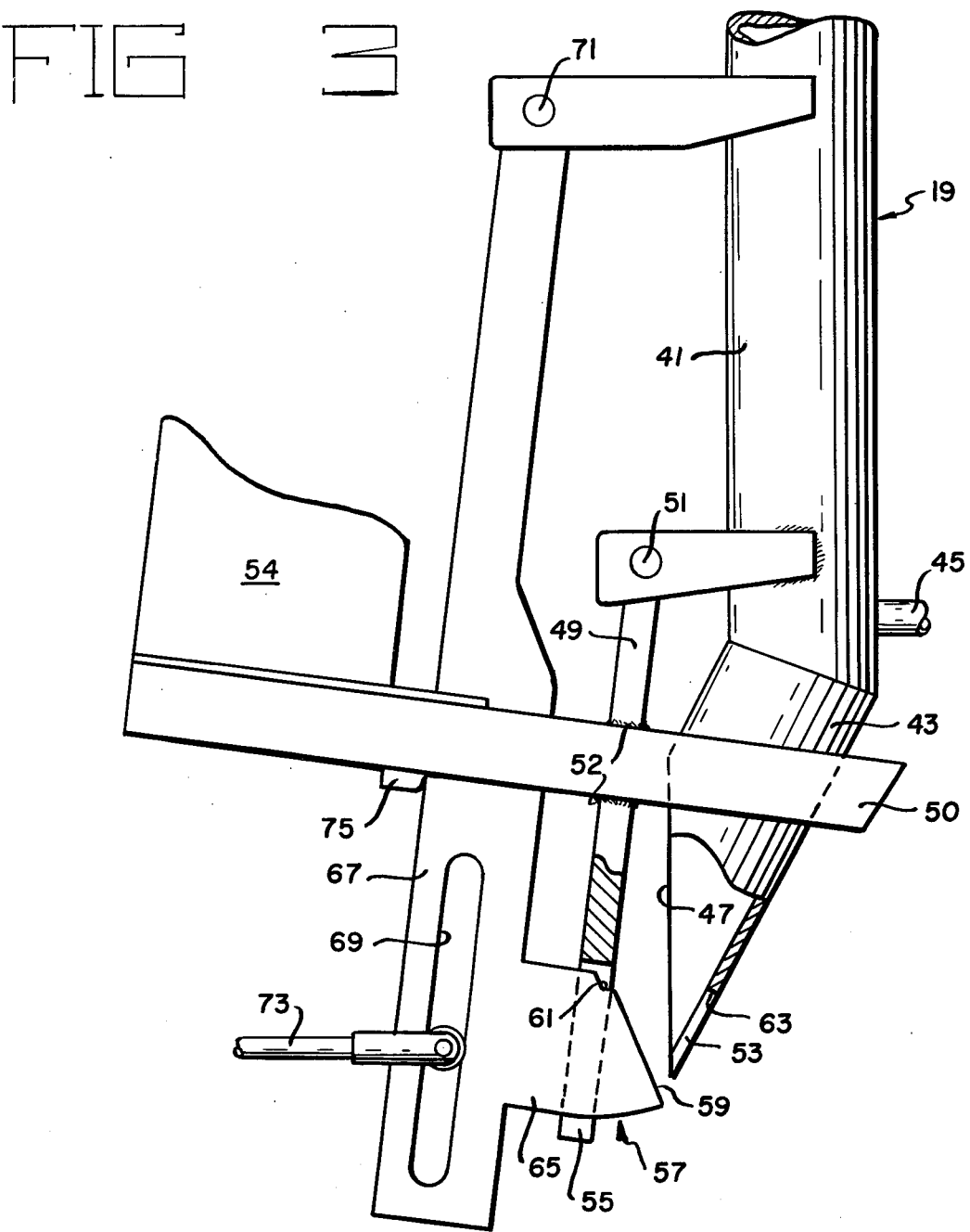

4,184,662

VALVE FOR CONTROLLING SOLIDS FLOW

CONTRACTUAL ORIGIN OF THE INVENTION

The invention described herein was made in the course or, or under, a contract with the UNITED STATES DEPARTMENT OF ENERGY.

BACKGROUND OF THE INVENTION

The present invention relates to valves used for controlling the flow of fluidized solids in applications where the fluidization may be lost and static solids may accumulate. It is particularly well adapted for use in processes for the gasification or liquefaction of coal or other solid carbonaceous fuels or in processes for the fluidized bed combustion of such material.

The flow of finely divided solids is conveniently controlled in the unfluidized state with mechanical feeders, e.g. reciprocating or rotating conveyors or with valves having translating, rotating or sliding closure plates. However, in systems having extreme environments that must be well contained, such as in high temperatures, pressures or with corrosive materials, these conventional devices for maintaining a metered flow of solids are unsuitable or extremely inconvenient.

Various commercially available valves include pivoted or rotatable closure members that can be operated to present wide openings for solids flow. One such device is known as a trickle or flapper valve that includes a hinged closure plate that can be biased in the closed position by back pressure. A valve of this type provides poor flow control of solids as they tend to clog the flow channel and a small valve movement produces a large flow area. Where a pressure differential is used for biasing, the opening of the valve can actually produce an upward gas flow to restrict the desired solids release.

SUMMARY OF THE INVENTION

It is therefore an object of the present invention to provide an improved valve for regulating a flow of solids.

It is a further object to provide such a valve which will control a flow of fluidized solids and accommodate periodic accumulation of particles that form a fixed bed.

It is also an object to provide an uncomplicated control valve for solids flow requiring a minimum of maintenance to be used within an enclosed vessel under extreme or corrosive conditions.

It is a further object to provide a valve that can permit flow regulation of solids from an upper fluidized bed region of lower pressure into a lower fluidized bed region of greater pressure at minimal reverse gas flow.

In accordance with the present invention, a valve is provided for controlling the flow of solids through a tubular body terminating in a valve seat at its bottom portion. A closure plate is biased to normally close the valve seat. A longitudinal slot communicating with the valve seat extends along the valve body and receives a movable key plate adapted to slide within and partially or fully close the longitudinal slot. An operator device is adapted to position the key plate in an inserted position to close the slot, in intermediate positions with the slot partially closed and in a retracted position with the slot fully opened. Suitable motion transfer means is provided for opening the closure plate away from the valve seat when the key plate is moved to its retracted position.

BRIEF DESCRIPTION OF THE DRAWINGS

The present invention is illustrated in the accompanying drawings wherein:

FIG. 2 is an elevation view, partially broken away, of a solids flow control valve in a fully closed position and with a partially closed position illustrated in phantom.

FIG. 3 is the valve of FIG. 2 illustrated in an open position.

DETAILED DESCRIPTION OF THE PREFERRED EMBODIMENT

Figure 1:
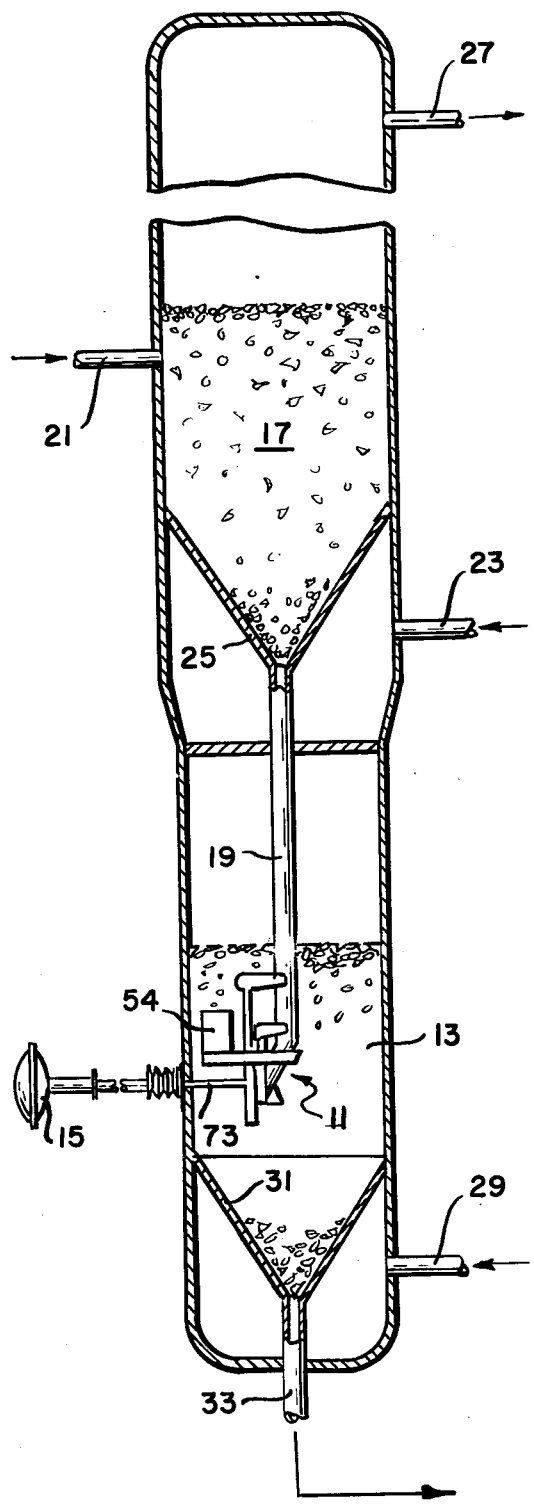
FIG. 1 is a schematic elevation view of a gasifier for solid carbonaceous material employing a solids flow control valve.

In FIG. 1, a gasifier for coal is illustrated to show one application of the solids flow control valve of the present invention. The FIG. 1 gasifier is based on the Synthane Coal Gasification Power Plant, at South Park Township, Pa, operated by The Lummus Company for the United State Department of Energy. It will be clear that this particular gasifier is shown for purposes of illustration only and that the valve of this invention will have a large number of applications in the control of solids flow.

In FIG. 1, the solids flow control valve 11 is shown within the char cooling section 13 of the gasifier. The valve is modulated by a remotely controlled operator 15 to permit the discharge of char solids from gasifier section 17 through dip leg 19 to the char cooling section 13.

In the operation of this gasifier, coal or other carbonaceous material at 21 is fed into the gasifier section 17 where the coal particles are fluidized and reacted with a flow of steam and oxygen introduced at 23 just below the gasifier section. A distribution network within the lower cone 25 of the gasifier section admits the pressurized steam and oxygen into the gasifier. The resulting coal gas produced by reaction with the solid coal particles is withdrawn at 27 for further processing.

Char from the gasifier section 17 is fed into the char cooling section 13 through the solids flow control valve 11. The solids within the lower portion of dip leg 19 adjacent valve 11 are normally fluidized by a flow of steam or other fluidizing medium (inlet illustrated in FIG. 2 at 45) such that operator 15 can control valve 11 to maintain a regulated flow of char into cooler 13. However, on occasion large quantities of char may accumulate and form a static column within dip leg 19 that can be removed through valve 11 because of its capability of presenting a substantially increased opening for the flow of char.

The char within cooler section 13 is fluidized and cooled by a flow of steam admitted at 29 and distributed into the cooler 13 through a suitable distribution pattern within cone 31. The cooled char is withdrawn through an outlet 33 at the cone apex for further processing.

One troublesome aspect of this particular application for the solids control valve is that the pressure within the char cooling section 13 may be maintained at a higher level than the pressure within gasifier 17 to prevent oxygen from entering cooler 13. If an ordinary flapper valve were employed in this application, the upward flow of gas through the valve may interfere with the downward passage of char. As will be made clear below, the present solids flow control valve includes novel structural features that overcome this control difficulty. It will also be clear that the valve described herein can operate with a gas pressure differential either against or with the direction of solids flow.

Figure 4:
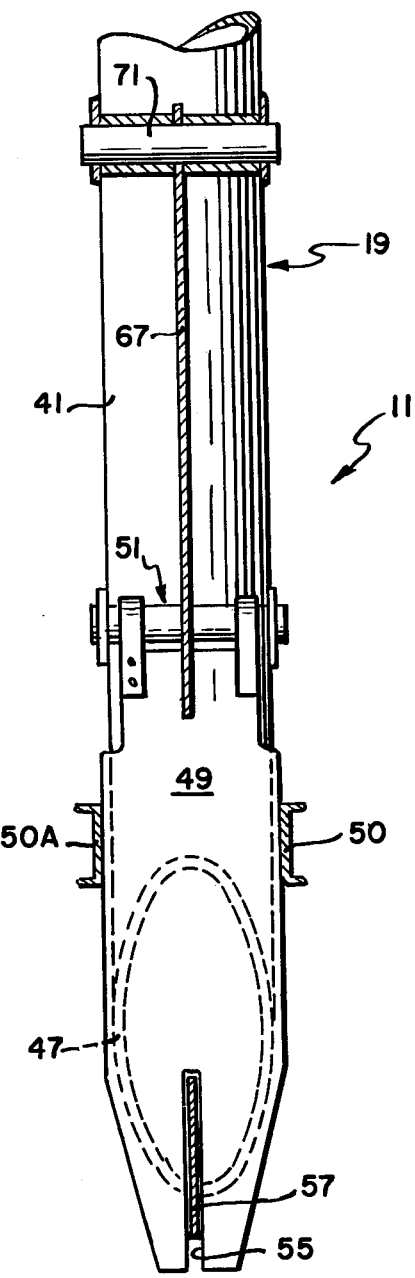
FIG. 4 is a cross-sectional view of the valve structure illustrated in FIG. 2.

Referring now to FIGS. 2, 3 and 4 where the present solids flow control valve is presented in more detail. The valve body 41 can be merely an extension of dip leg 19 and preferably is provided with an angular lower portion 43 that is oblique to the vertical. This arrangement permits upright installation of the valve control and weighted components. A fluid inlet 45 is provided for introducing a fluidizing medium for facilitating solids downward flow. For example, steam can be admitted at inlet 45 in a coal gasification system.

The lower portion of the valve body 43 terminates with valve seat 47 illustrated as elongated or elliptical behind the closure plate in FIG. 4. Valve seat 47 is normally closed by a pivoted closure plate 49 supported at a hinge or other suitable pivot 51.

A longitudinal slot 53 is provided within the walls of lower valve portion 43 beginning at valve seat 47 and extending to a point along the valve body length. A corresponding slot 55 is provided in closure plate 49. Slots 53 and 55 are of about the same width, sized and aligned to receive a key plate 57 for substantially closing both of the slots for purposes of controlling flow through valve body portion 43.

Key plate 57 can be shaped to include an oblique distal edge 59 and a flat proximal portion 65. Edge 59 presents a shearing and slanting entry into longitudinal slot 53. The top of edge 59 merges into a recess 61 for sealing against the uppermost edge 63 of slot 53. Key plate 57 can be moved from the fully inserted position through intermediate positions, as illustrated in FIG. 2 in solid lines and in phantom, to provide a progressively increasing cross section of slot 53 openings for the regulation of solids flow from the valve.

During the flow-regulating mode of operation, closure plate 49 is biased firmly against valve seat 47 to restrict flow to the opening in longitudinal slot 53. For most of the retractive travel of key plate 57, slot 55 within closure plate 49 is substantially closed by the proximal portion 65 of the key plate. This proximal portion 65 of the key plate is aligned to occlude slot 55 within closure plate 49 at its top and side portions, as illustrated. Consequently, the regulation of solids flow is conducted substantially through the opening in longitudinal slot 53.

Closure plate 49 is biased in a closed position against valve seat 47 by weighted lever and guide members 50 and 50A. Weighted levers 50 and 50A are firmly attached to closure plate 47 at their points 52 of overlapping contact so as also to be supported by pivot 51. One end of levers 50 and 50A is illustrated in embracement of valve body portion 43 for providing a guide to travel, as will be described below. The opposite end portions of levers 50 and 50A support a counterweight 54 which acts through support pivot 51 to bias closure plate 49 against valve seat 47.

Key plate 57 is attached to a slotted connecting lever 67 which in one function serves to guide and provide support to the key plate during its travel between the inserted and retracted positions. Slotted lever 67 is supported at a second pivot 71 which, like pivot 51, may be cantilevered from the upper valve body 41. Pivotal travel of key plate 57 along with slotted lever 67 is provided by operator arm 73 that is activated by the operator 15 illustrated in FIG. 1. Arm 73 slidingly engages longitidunal slot 69 to permit the necessary movement along the lever length as the key plate traverses between inserted and retracted positions within slot 53.

Weighted levers 50 and 50A are interconnected at cross bar 75 to provide a stop to the pivotal travel of lever 67. On retractive movement of activator arm 73 to a point illustrated in phantom in FIG. 2 where key plate 57 is or is nearly retracted from slot 53, lever 67 engages stop 75 to begin an outward and upward pivoting or counterweight 54 about pivot 51. This engagement and travel begins to withdraw closure plate 49 way from valve seat 47 to the open position illustrated in FIG. 3. Less retractive displacement of the key plate 57 and activator arm 73 permits modulation of the open portion of slot 53 for flow regulation. The fully retractive mode illustrated in FIG. 3 permits a large flow or dumping of solids that may have accumulated and prohibited flow regulation through slot 53.

It will therefore be seen that the present invention provides a novel solids flow control valve that is capable of regulating the flow of fluidized solids through a relatively small opening. The valve also can accommodate the clearing of particle accumulation from the valve body by presenting a substantially increased opening for solids flow. The valve permits solids flow from a region of lower pressure to one of higher pressure while minimizing gas leakage.

It will also be clear that, although the present development is described in terms of a particular embodiment, various modifications to the structure, materials and mechanical configurations can be made by those skilled in the art in accordance with the invention as defined in the attached claims.

The embodiments of the invention in which an exclusive property or privilege is claimed are defined as follows :

1. In a valve for controlling solids flow having a tubular body terminating in its bottom portion with a valve seat and a closure plate which is biased to normally close the valve seat, the improvement comprising:
  a longitudinal slot along a portion of the valve body length communicating with the valve seat for passing a regulated flow of solids;
  a movable key plate adapted to slide within and close the longitudinal slot;
  means for positioning the key plate in an inserted position to close the slot, in a retracted position to open the slot and in intermediate positions to regulate solids flow; and
  means responsible to the position of the key plate for opening the closure plate away from the valve seat when they key plate is in the retracted position.

2. The valve of claim 1 wherein said valve body comprises a vertical upper portion and an angular bottom portion terminating with said valve seat and longitudinal slot.

3. The valve of claim 1 wherein said key plate is connected to an operator capable of maintaining said plate in a plurality of intermediate positions between said inserted and retracted positions to regulate flow of solids through said longitudinal slot.

4. The valve of claim 3 wherein a first pivot is provided to support said closure plate and a biasing weight to maintain the closure plate against the valve seat in a closed mode when said key plate is in an intermediate or inserted position, and a second pivot carrying a connecting lever is provided to support said key plate as it travels in respect to said longitudinal slot, said connecting lever engaging said biasing weight when said key plate is in a retracted position to permit movement of the closure plate away from the valve seat.

5. The valve of claim 1 wherein said closure plate includes a slotted opening closely aligned with said longitudinal slot to receive and pass the key plate, said key plate having a size and shape to substantially close the slotted opening when in intermediate and inserted positions.

6. The valve of claim 1 wherein said key plate having a distal end portion that is obliquely received within said longitudinal slot to provide a progressive increase in slot opening as the key plate is withdrawn from the inserted to intermediate and retracted positions.

7. The valve of claim 1 wherein an inlet is provided for introducing a purge fluid within said valve body to fluidize solids behind said closure plate and slot.

8. The valve of claim 1 wherein said closure plate is biased against said valve seat by a pivoted lever and weight.

9. The valve of claim 8 wherein said closure plate is biased against said valve seat by weighted guide members attached to said pivoted lever and having guide arm portions embracing said valve body.

10. The valve of claim 9 wherein a cross bar is provided between said guide members for engagement with said key plate positioning means for overbalancing said weighted guide members and opening said closure plate from the valve seat when the key plate is moved to a retracted position.

* * * * *